United States Patent
Bin et al.

(10) Patent No.: US 12,547,758 B1
(45) Date of Patent: Feb. 10, 2026

(54) SYSTEM, METHOD, AND COMPUTER PROGRAM FOR TRANSMITTING DATA BETWEEN A BACKUP SYSTEM AND AN EXTERNAL APPLICATION USING AN ENCRYPTION PROXY WITHIN A CUSTOMER-CONTROLLED DATA PERIMETER

(71) Applicant: Odaseva Technologies SAS, Neuilly-sur-Seine (FR)

(72) Inventors: Sovane Bin, San Francisco, CA (US); Francois Lopitaux, San Carlos, CA (US); Arnaud Treps, Paris (FR); Remi Poujeaux, Rueil-Malmaison (FR); Saddek Dekoum, Ris-Orangis (FR); Arnaud Deronne, Castelnau le Iez (FR); Maxime Aubanel, Toulouse (FR); Julien Carmigani, Sèvres (FR)

(73) Assignee: Odaseva Technologies SAS, Neuilly-sur-Seine (FR)

( * ) Notice: Subject to any disclaimer, the term of this patent is extended or adjusted under 35 U.S.C. 154(b) by 164 days.

(21) Appl. No.: 18/210,591

(22) Filed: Jun. 15, 2023

(51) Int. Cl.
G06F 21/62 (2013.01)
G06F 11/14 (2006.01)
(Continued)

(52) U.S. Cl.
CPC ...... *G06F 21/6236* (2013.01); *G06F 11/1469* (2013.01); *G06F 21/602* (2013.01); *H04L 9/0618* (2013.01); *G06F 2201/84* (2013.01)

(58) Field of Classification Search
CPC ............... G06F 21/6236; G06F 21/602; G06F 11/1469; G06F 2201/84
See application file for complete search history.

(56) References Cited

U.S. PATENT DOCUMENTS 6,642,946 B1  11/2003  Janes et al.
8,078,645 B2  12/2011  Singh
(Continued)

FOREIGN PATENT DOCUMENTS

CA  2634576  12/2008
WO  2022081408  4/2022

*Primary Examiner* — Hee K Song
(74) *Attorney, Agent, or Firm* — Lessani Law Group, PC

(57) ABSTRACT

The present disclosure describes a system, method, and computer program for transmitting data between a backup system and an external application using an encryption proxy that is within a customer-controlled data perimeter. The encryption proxy virtually resides within a customer-controlled data perimeter and acts as an intermediary between the external application and backup system. The backup system is outside the customer-controlled data perimeter. Data is transferred between the external application and the backup system to perform backup and recovery operations. The encryption proxy encrypts and decrypts data messages between the external application and the backup application in accordance with configurable data transfer rules. The encryption proxy enables a customer to control which data items are transferred to the backup system in clear text and which data items are encrypted before being forwarded to the backup system. When performing a restore operation, encrypted data items transmitted from the backup application enroute to the external application are converted back to cleartext by the encryption proxy so that they are received as cleartext by the external application.

9 Claims, 6 Drawing Sheets

(51) Int. Cl.
*G06F 21/60* (2013.01)
*H04L 9/06* (2006.01)

(56) References Cited

U.S. PATENT DOCUMENTS

| | | | |
|---|---|---|---|
| 8,255,320 B1 | 8/2012 | Seal et al. | |
| 8,667,273 B1 | 3/2014 | Billstrom et al. | |
| 8,775,328 B1 | 7/2014 | Abhyanker | |
| 9,268,587 B2 | 2/2016 | Kruglick | |
| 9,288,184 B1 | 3/2016 | Kvamme et al. | |
| 9,330,301 B1 | 5/2016 | Ozog | |
| 9,769,131 B1 | 9/2017 | Hartley et al. | |
| 9,794,064 B2 * | 10/2017 | Anderson | H04L 9/0894 |
| 9,990,511 B1 | 6/2018 | Dreyfus | |
| 10,664,494 B2 | 5/2020 | Ding et al. | |
| 11,055,123 B1 | 7/2021 | Bin et al. | |
| 11,609,774 B2 | 3/2023 | Bin et al. | |
| 12,032,718 B1 | 7/2024 | Bin et al. | |
| 12,056,723 B1 | 8/2024 | Bin et al. | |
| 12,210,640 B1 | 1/2025 | Bin et al. | |
| 12,229,099 B1 | 2/2025 | Bin et al. | |
| 12,235,737 B1 | 2/2025 | Bin et al. | |
| 2006/0150169 A1 | 7/2006 | Cook et al. | |
| 2008/0016127 A1 | 1/2008 | Field | |
| 2008/0049942 A1 | 2/2008 | Sprunk et al. | |
| 2008/0162532 A1 | 7/2008 | Daga | |
| 2008/0270444 A1 | 10/2008 | Brodie et al. | |
| 2008/0310633 A1 | 12/2008 | Brown et al. | |
| 2009/0031230 A1 | 1/2009 | Kesler | |
| 2010/0079460 A1 | 4/2010 | Breeds et al. | |
| 2012/0059857 A1 | 3/2012 | Jackson, Jr. | |
| 2012/0110566 A1 | 5/2012 | Park | |
| 2012/0117558 A1 | 5/2012 | Futty et al. | |
| 2012/0246472 A1 | 9/2012 | Berengoltz et al. | |
| 2012/0254197 A1 | 10/2012 | Kuzmin | |
| 2012/0324242 A1 | 12/2012 | Kirsch | |
| 2013/0191780 A1 | 7/2013 | Holmes et al. | |
| 2013/0227703 A1 | 8/2013 | Sotos et al. | |
| 2013/0246451 A1 | 9/2013 | Kaiser | |
| 2013/0283060 A1 | 10/2013 | Kulkarni et al. | |
| 2013/0297769 A1 | 11/2013 | Chang et al. | |
| 2014/0040182 A1 | 2/2014 | Gilder et al. | |
| 2014/0040196 A1 | 2/2014 | Wijayaratne et al. | |
| 2014/0040197 A1 | 2/2014 | Wijayaratne et al. | |
| 2014/0101438 A1 | 4/2014 | Elovici et al. | |
| 2014/0143661 A1 | 5/2014 | Carreno-Fuentes et al. | |
| 2014/0278534 A1 | 9/2014 | Romeo | |
| 2014/0344778 A1 | 11/2014 | Lau et al. | |
| 2015/0019858 A1 * | 1/2015 | Roth | H04L 63/0471 726/1 |
| 2016/0019233 A1 | 1/2016 | Wijayaratne et al. | |
| 2016/0147999 A1 | 5/2016 | Fontanetta et al. | |
| 2016/0156671 A1 * | 6/2016 | Cabrera | H04L 63/20 726/1 |
| 2016/0277374 A1 | 9/2016 | Reid et al. | |
| 2016/0308855 A1 | 10/2016 | Lacey et al. | |
| 2017/0025040 A1 | 1/2017 | Maturana et al. | |
| 2017/0048252 A1 | 2/2017 | Straub et al. | |
| 2017/0091293 A1 | 3/2017 | Cummings et al. | |
| 2017/0249656 A1 | 8/2017 | Gantner et al. | |
| 2018/0081905 A1 | 3/2018 | Kamath et al. | |
| 2018/0089270 A1 | 3/2018 | Qiu et al. | |
| 2018/0150476 A1 | 5/2018 | Koos et al. | |
| 2018/0176117 A1 | 6/2018 | Gudetee et al. | |
| 2018/0181613 A1 | 6/2018 | Acharya et al. | |
| 2018/0232402 A1 | 8/2018 | Bhatti et al. | |
| 2018/0336209 A1 | 11/2018 | Burshteyn | |
| 2019/0007206 A1 | 1/2019 | Surla et al. | |
| 2019/0034509 A1 | 1/2019 | Ding et al. | |
| 2019/0042988 A1 | 2/2019 | Brown et al. | |
| 2019/0050925 A1 | 2/2019 | Hodge et al. | |
| 2019/0303270 A1 | 10/2019 | Hoermann | |
| 2020/0026532 A1 | 1/2020 | Bill et al. | |
| 2020/0067772 A1 | 2/2020 | Tomkins et al. | |
| 2020/0073854 A1 | 3/2020 | Wijayaratne et al. | |
| 2020/0082890 A1 | 3/2020 | Karr et al. | |
| 2020/0127937 A1 | 4/2020 | Busick et al. | |
| 2020/0159700 A1 | 5/2020 | Wijayaratne et al. | |
| 2020/0183906 A1 | 6/2020 | Spillane et al. | |
| 2020/0226953 A1 | 7/2020 | Anand et al. | |
| 2020/0336481 A1 | 10/2020 | Fan et al. | |
| 2020/0342117 A1 | 10/2020 | Richards et al. | |
| 2020/0387625 A1 | 12/2020 | Saad | |
| 2021/0026982 A1 | 1/2021 | Amarendran et al. | |
| 2021/0049029 A1 | 2/2021 | Kumble et al. | |
| 2021/0067324 A1 | 3/2021 | Valente et al. | |
| 2021/0191629 A1 | 6/2021 | Vibhor et al. | |
| 2021/0255991 A1 | 8/2021 | Koos et al. | |
| 2021/0255992 A1 | 8/2021 | Wijayaratne et al. | |
| 2021/0349580 A1 | 11/2021 | Dentzer | |
| 2021/0365414 A1 | 11/2021 | Lu et al. | |
| 2021/0365587 A1 | 11/2021 | Lu et al. | |
| 2022/0067115 A1 | 3/2022 | Zheng et al. | |
| 2022/0107826 A1 | 4/2022 | Bin et al. | |
| 2022/0129804 A1 | 4/2022 | Dooley et al. | |
| 2022/0148084 A1 | 5/2022 | Baker | |
| 2022/0188334 A1 | 6/2022 | Chen | |
| 2022/0207489 A1 | 6/2022 | Gupta et al. | |
| 2022/0263657 A1 | 8/2022 | Chang et al. | |
| 2022/0269809 A1 | 8/2022 | Chopra et al. | |
| 2022/0317831 A1 | 10/2022 | Karis et al. | |
| 2023/0010219 A1 | 1/2023 | Howley et al. | |
| 2023/0082010 A1 | 3/2023 | Clifford et al. | |
| 2023/0145349 A1 | 5/2023 | Watari | |
| 2023/0237034 A1 | 7/2023 | Garg et al. | |
| 2023/0281305 A1 | 9/2023 | Savry et al. | |
| 2023/0315694 A1 | 10/2023 | Koos et al. | |
| 2023/0325360 A1 | 10/2023 | Wijayaratne et al. | |
| 2024/0012921 A1 * | 1/2024 | Yannuzzi | G06F 21/6218 |
| 2024/0020414 A1 | 1/2024 | Burns | |
| 2024/0045811 A1 | 2/2024 | Gurin | |
| 2024/0064020 A1 | 2/2024 | Kiraz et al. | |
| 2024/0220656 A1 | 7/2024 | Nozawa et al. | |
| 2025/0165357 A1 | 5/2025 | Bin et al. | |

* cited by examiner

Example: Transfer Rules Definition: Data-item Level

Encryption rules

| Default |
|---|
| Do not encrypt fields |
| Id |
| type |
| IsActive |
| MasterRecordId |
| IsDeleted |
| OwnerId |
| CreatedDate |
| CreatedById |
| LastModifiedDate |
| LastModifiedById |
| SystemModstamp |
| LastActivityDate |
| LastViewedDate |
| LastReferencedDate |
| SystemModstamp |
| NEW: Enter a value then press Enter |

SYSTEM, METHOD, AND COMPUTER PROGRAM FOR TRANSMITTING DATA BETWEEN A BACKUP SYSTEM AND AN EXTERNAL APPLICATION USING AN ENCRYPTION PROXY WITHIN A CUSTOMER-CONTROLLED DATA PERIMETER

BACKGROUND OF THE INVENTION

1. Field of the Invention

This invention relates generally to backup systems and, more specifically, to a system and method for transmitting customer data between a backup system and an external application using an encryption proxy within a customer-controlled data perimeter.

2. Description of the Background Art

Many enterprise software vendors offer "software as a service" ("SaaS") in which the vendor runs the software and stores customer data "in the cloud." Most SaaS platforms are multi-tenant environments in that customers share the underlying infrastructure (e.g., the servers and databases that the power the software service). For example, a SaaS provider may host thousands or tens of thousands of customers at a single point of deployment. Examples of SaaS providers include SALESFORCE, ORACLE, and MICROSOFT AZURE. SaaS customers do not own or control the infrastructure on which the software is run and on which their data is stored. They just have access to the service.

While SaaS providers have redundancy and failover mechanisms in the event of a failure, the activation of the failover is under the control of the SaaS provider and not the customer of the SaaS provider. Moreover, such redundancy and failover mechanisms do not protect from a customer accidentally deleting its own data. As a result, many SaaS customer elect to back up their own data within the SaaS environment with an external, third-party backup provider. This may be for the purpose of providing backup and restore capability, as well as the ability to quickly access data from another cloud platform should the SaaS provider have a failure.

Most enterprises consider their data to be proprietary and guard it carefully. While customer want the protection that backup offers, they are also reluctant to give data access to a third-party backup provider, as it increases the risk of a data breach. Therefore, there is demand for a system and method for backing up sensitive data in a storage system using an external backup system without enabling the external backup system to view the sensitive data at any stage of the backup/restore process. Finally, the data owner would like to have such functionality with no impact on his or her user experience.

SUMMARY OF THE DISCLOSURE

The present disclosure describes a system, method, and computer program for transmitting data between a backup system and an external application using an encryption proxy that is within a customer-controlled data perimeter. The encryption proxy enables a backup system to backup sensitive data in the external application while preventing the backup system from viewing the sensitive data at any stage of the backup/restore process.

The encryption proxy virtually resides within a customer-controlled data perimeter and acts as an intermediary between the external application and backup system. The backup system is outside the customer-controlled data perimeter. The encryption proxy encrypts and decrypts data messages between the external application and the backup application in accordance with data transfer rules. The data transfer rules are configurable by the customer. In one embodiment, the customer configures the data transfer rules to specify the types of messages requiring encryption/decryption and to specify the data items permitted in cleartext beyond the customer-controlled data perimeter. In certain embodiments, the backup application performs backup and restore operations for a plurality of customers of the external application, and each customer can configure its own data transfer rules.

Data is transferred between the external application and the backup system to perform backup and recovery operations. The encryption proxy enables a customer to control which data items leave the customer-controlled data perimeter in cleartext form and which data items are encrypted before leaving the customer-controlled data perimeter. When performing a restore operation, encrypted data items transmitted from the backup application enroute to the external application are converted back to cleartext by the encryption proxy.

The encryption proxy has no impact on a customer's experience in interacting with the external application. The encryption proxy does not reside between the customer and the external application, but between the external application and the backup system.

In one embodiment, a method for transmitting customer data between a backup system and an external application comprises the following steps:
- providing an encryption proxy between a backup system and an external application, wherein the encryption proxy is within a customer-controlled data perimeter and wherein the backup system is outside the customer-controlled data perimeter;
- enabling a customer to configure data transfer rules that specify a set of data items in the customer data that are permitted in cleartext beyond the customer-controlled data perimeter;
- transmitting messages between the external application and the backup system via the encryption proxy, wherein:
    - when the encryption proxy receives a message with a data payload having data items from the external application for transmission to the backup system, the encryption proxy converts the data items to ciphertext, except for those data items permitted in cleartext beyond the customer-controlled data perimeter per the configurable data transfer rules, before forwarding the message to the backup system; and
    - when the encryption proxy receives a message from the backup system to the external application having a data payload with one or more data items in ciphertext, the encryption proxy converts said data items from ciphertext to cleartext before forwarding the message to the external application.

BRIEF DESCRIPTION OF THE DRAWINGS

FIG. 5 is a screenshot illustrating an example user interface for configuring data transfer rules at the data field level.

DETAILED DESCRIPTION OF THE PREFERRED EMBODIMENTS

The present disclosure describes a system, method, and computer program for transmitting data between a backup system and an external application using an encryption proxy that is within a customer-controlled data perimeter. The encryption proxy ensures that a customer's sensitive data remains in cleartext within a customer-controlled data perimeter and remains in cyphertext outside the customer-controlled data perimeter. As a result, the encryption proxy enables a backup system to backup sensitive data in the external application while preventing the external backup system from viewing the sensitive data at any stage of the backup/restore process. The methods disclosed herein performed by a computer system ("the system").

1. Definitions

External application: An application outside the control of the backup system that uses customer data. The external application may run on servers on the customer's premise or may run on third-party, cloud-based platforms, such as MICROSOFT AZURE. The external application may be a cloud-based, multi-tenant SaaS application, such as SALESFORCE.

Encryption proxy: A software module capable of encrypting and decrypting data that serves as a proxy for the backup system in communications with the external application. The encryption proxy resides within a customer-controlled data perimeter.

Customer-controlled data perimeter: A virtual data boundary that encompasses data that is within the customer's control and not within the backup system's control. If the external application runs on a multi-tenant, cloud-based platform, the external application is considered within the customer-control data perimeter with respect to the customer's data in the external application.

Backup System: a system that stores a copy of customer data for backup and restore purpose or for providing backup access to customer's data.

2. Method for Transmitting Data Using an Encryption Proxy

Figure 1:
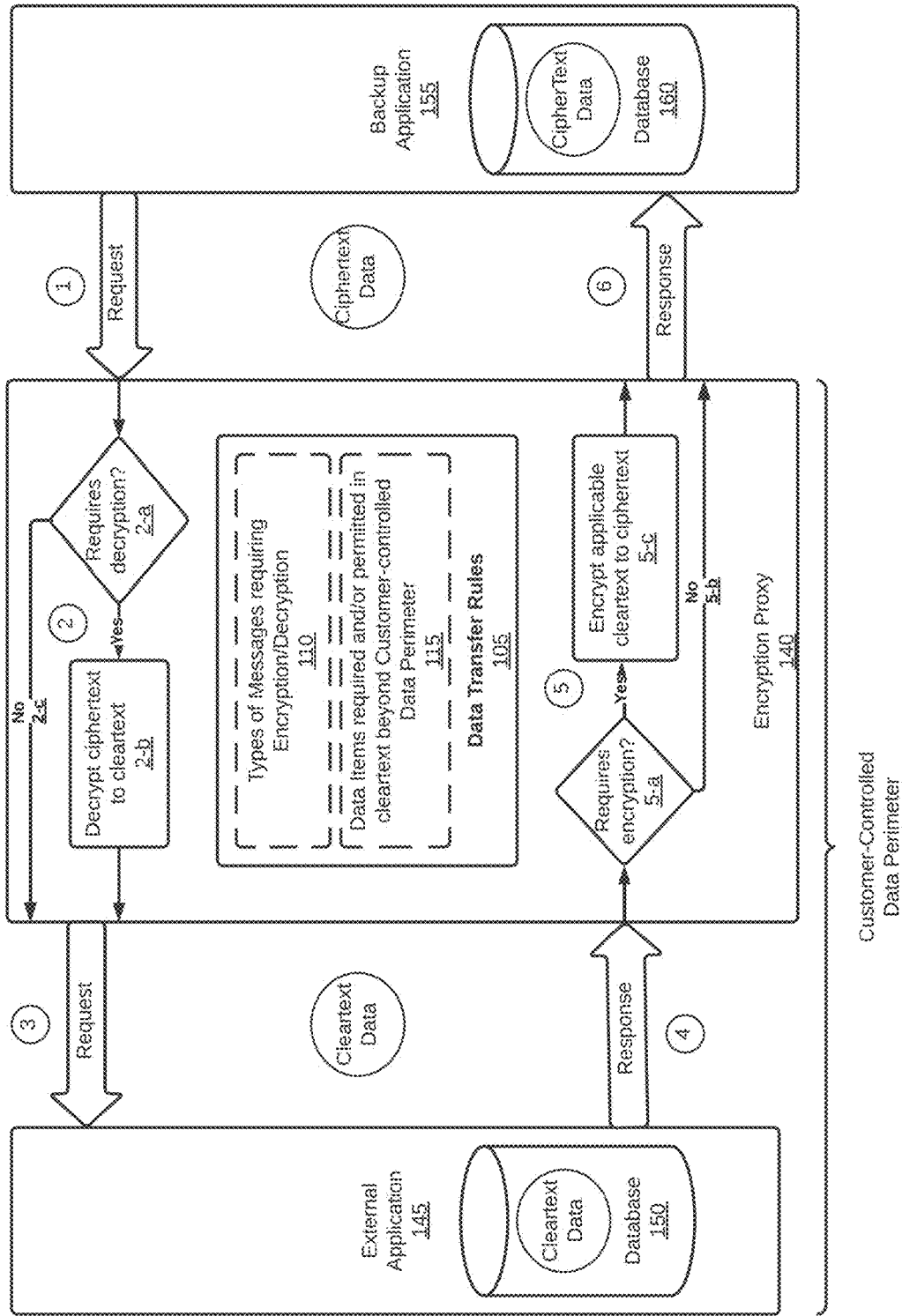
FIG. 1 is a block diagram that illustrates a method, according to one embodiment, for transmitting data between a backup system and an external application using an encryption proxy.

FIG. 1 illustrates a method for transmitting data between a backup system and an external application using an encryption proxy. As shown in the figure, an external application 145 includes customer data 150 in cleartext form. A backup system 155 stores a copy of the customer data 160 for backup and restore purposes. An encryption proxy 140 serves as an intermediary between the external application 145 and the backup system 155.

Communications between the backup system and the external application are initiated when backup system sends a request intended for the external application to the encryption proxy (step 1). For example, the backup system may send a read request to obtain data for backup, or it may send a write request to restore customer data in the external application. The encryption proxy receives the request and determines whether the request is of a message type requiring decryption based on a set of configurable data transfer rules 105 (step 2-a). In one embodiment, the configurable data transfer rules 105 include:

(1) message-level rules that specify which types of messages transmitted between the backup system and the external application require encryption or decryption (110); and (2) data-item-level rules that specify which data items in the customer data are permitted in cleartext beyond the customer-controlled data perimeter (115).

In one embodiment, a data item is a field-value pair. Note that certain non-sensitive data items may need to remain unencrypted as a functional requirement for backup/restore processes to work.

These rules are configurable by the customer. In certain embodiments, the backup application performs backup and restore operations for a plurality of customers of the external application, and each customer can configure its own data transfer rules.

If the encryption proxy 140 determines (based on the data transfer rules 110) that the request is of message type that does not require any decryption, it forward the request to the external application without performing any decryption of the request (steps 2-c, 3). If the encryption proxy determines that the request is of a message type requiring decryption, the encryption proxy identifies the data items in the request that require decryption based on data-item-level rules 115 in the configurable data transfer rules 105. It then decrypts the identified data items from cyphertext to cleartext (step 2-c) and forwards the request with the decrypted data items to the external application (step 3).

The encryption proxy receives a response to the request from the external application (step 4). The encryption proxy determines whether the response requires any encryption based on the set of configurable data transfer rules (step 5-a). If the response is of a message type that does not require any encryption, the encryption proxy forwards the response to the backup system without encrypting any data items within the response (step 5-b). If the response is of a message type that requires encryption, the encryption proxy identifies the data items in the response that are permitted in cleartext beyond the customer-controlled data perimeter based on data-item-level rules 115 in the configurable data transfer rules 105. It then encrypts all the data items in the response, except for the identified data items, (step 5-c) and forwards the response with the encrypted data items to the backup system (step 6). The backup system stores the data in the response, including the encrypted data items.

2. Backup Example

Figure 2:
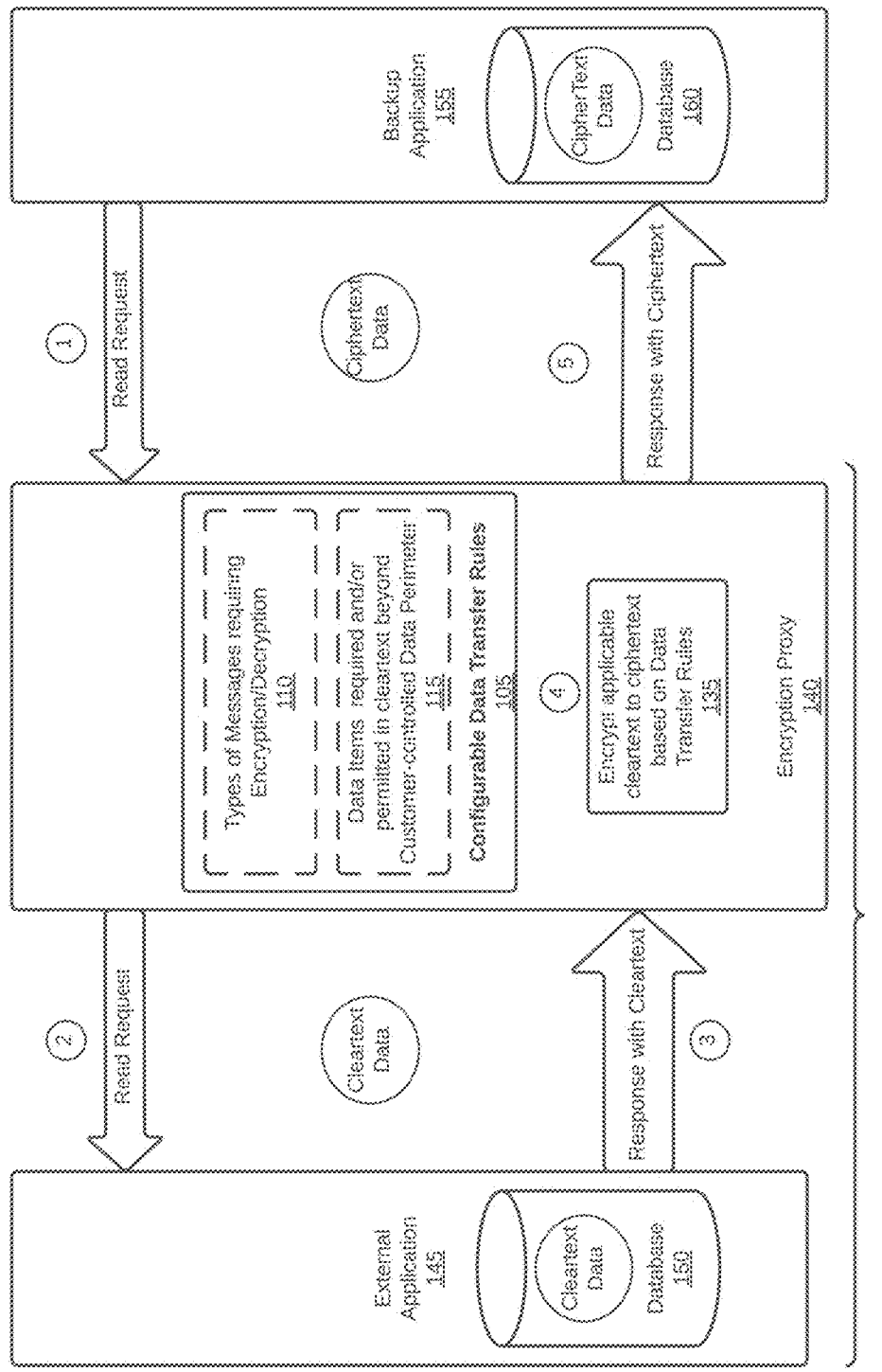
FIG. 2 is a block diagram that illustrate a backup method according to one embodiment.

FIG. 2 illustrate an example of the data transmissions between the backup system 155 and the external application 145 when the request in step 1 is a read request to extract data from the external application for back up. The backup system sends a read request for customer data in an external application to the encryption proxy 140 (step 1). In this example, the customer has configured the message-level rules 110 in the data transfer rules 105 to specify that a read request does not require any decryption. As a result, the encryption proxy simply forwards the read request to the external application (step 2). The external application responds to the read request with the requested data in cleartext form (step 3). The encryption proxy receives the response and determines that the response requires encryption based on the message-level rules 110 in the configurable data transfer rules 105. The encryption proxy identifies the data elements in the response that are permitted in cleartext beyond the customer-controlled data perimeter based on the data-item level rules 115 in the configurable data transfer rules 105. The encryption proxy then encrypts all the data items in the response to ciphertext, except for the identified data items (step 4). The encryption proxy then forwards the response (with the encrypted data items) to the backup system (step 5).

3. Restore Example

Figure 3:
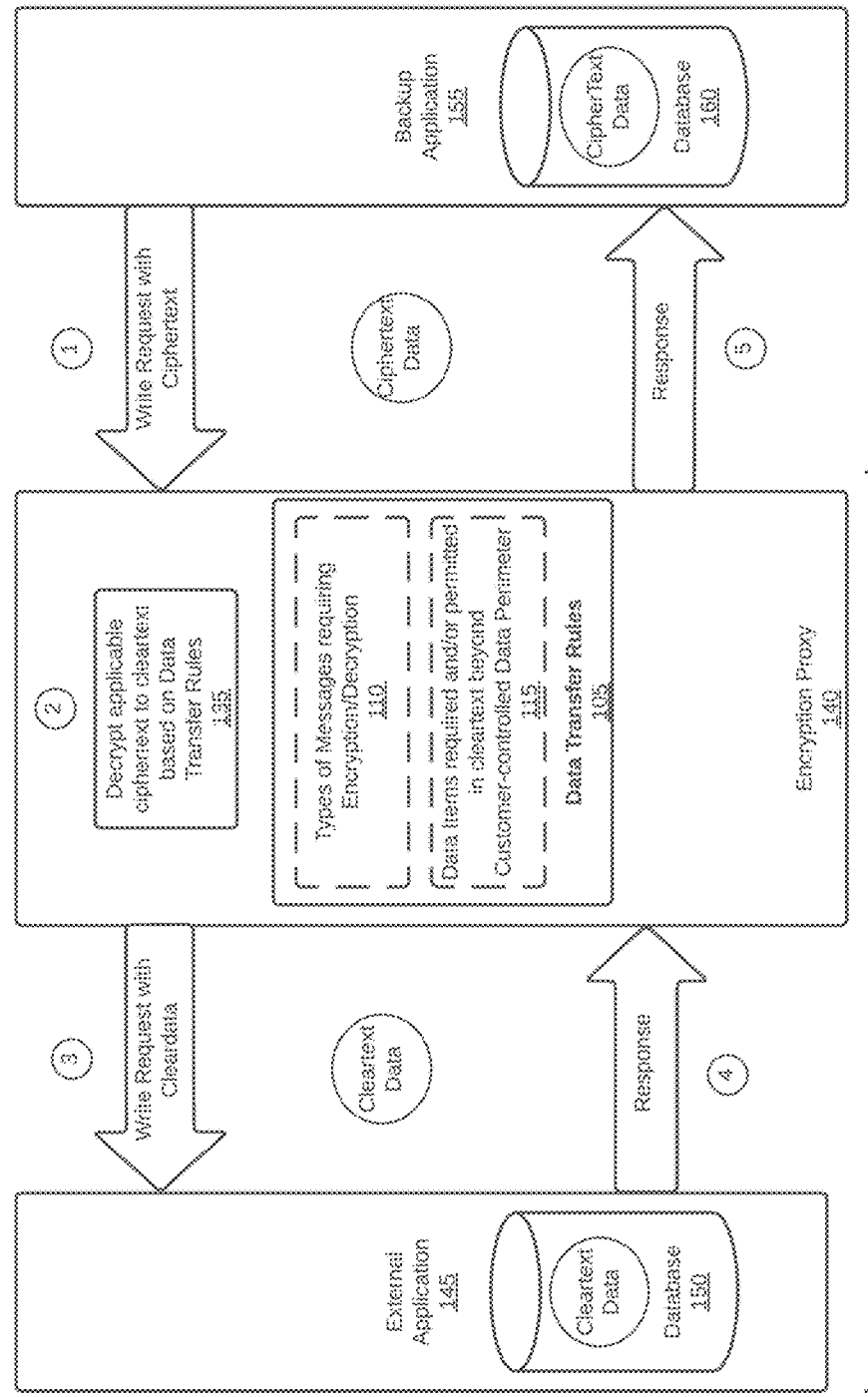
FIG. 3 is a block diagram that illustrates a restore method according to one embodiment.

FIG. 3 illustrate an example of the data transmissions between the backup system 155 and the external application 145 when the request in step 1 is a write request to restore data from the backup system to the external application. The backup system sends a write request to the encryption proxy (step 1). The write request is to restore customer data in the backup system to the external application, and the write request includes data in ciphertext.

The encryption proxy determines that the write request is a message type requiring decryption based on the message-level rules 110 in the configurable transfer rules 105. The encryption proxy identifies those data elements in the write request requiring decryption based on the data-item-level rules 115 in the set of configurable data transfer rules 105. Specifically, the encryption proxy identifies those data items that were permitted in cleartext beyond the customer-controlled data perimeter. The encryption proxy decrypts all the data items in the response to cleartext, except for the identified data items (as the identified data items are already in cleartext) (step 2). The encryption proxy then forwards the write request to the external application with all the data items in cleartext (step 3).

The external application receives the write request and restores the accompanying data in database 150. The external application then sends a response to the write request to the encryption proxy (step 4). The response is a confirmation that the write request was received and the data restored. In this example, the customer has configured the message-level rules 110 in the data transfer rules 105 to specify that a response to a write request does not require any encryption. As a result, the encryption proxy simply forwards the response to the backup system (step 5).

4. Example User Interfaces

Figure 4:
FIG. 4 is a screenshot illustrating an example user interface for configuring data transfer rules at the message level.

FIG. 4 illustrates an example user interface for configuring data transfer rules at the message level. In window 410, the user specifies the type(s) of request(s) from the backup system that require decryption. In window 420, the user specifies the type(s) of response(s) from the external application that require encryption.

FIG. 5 illustrates an example user interface for configuring data transfer rules at the data-item level. In the illustrated screen, the user specifies the data fields (and corresponding values) that are permitted in cleartext format outside the customer-controlled data perimeter. In this example, a default list 510 of fields is displayed in the user interface, and a user is able to edit the list.

Figure 6:
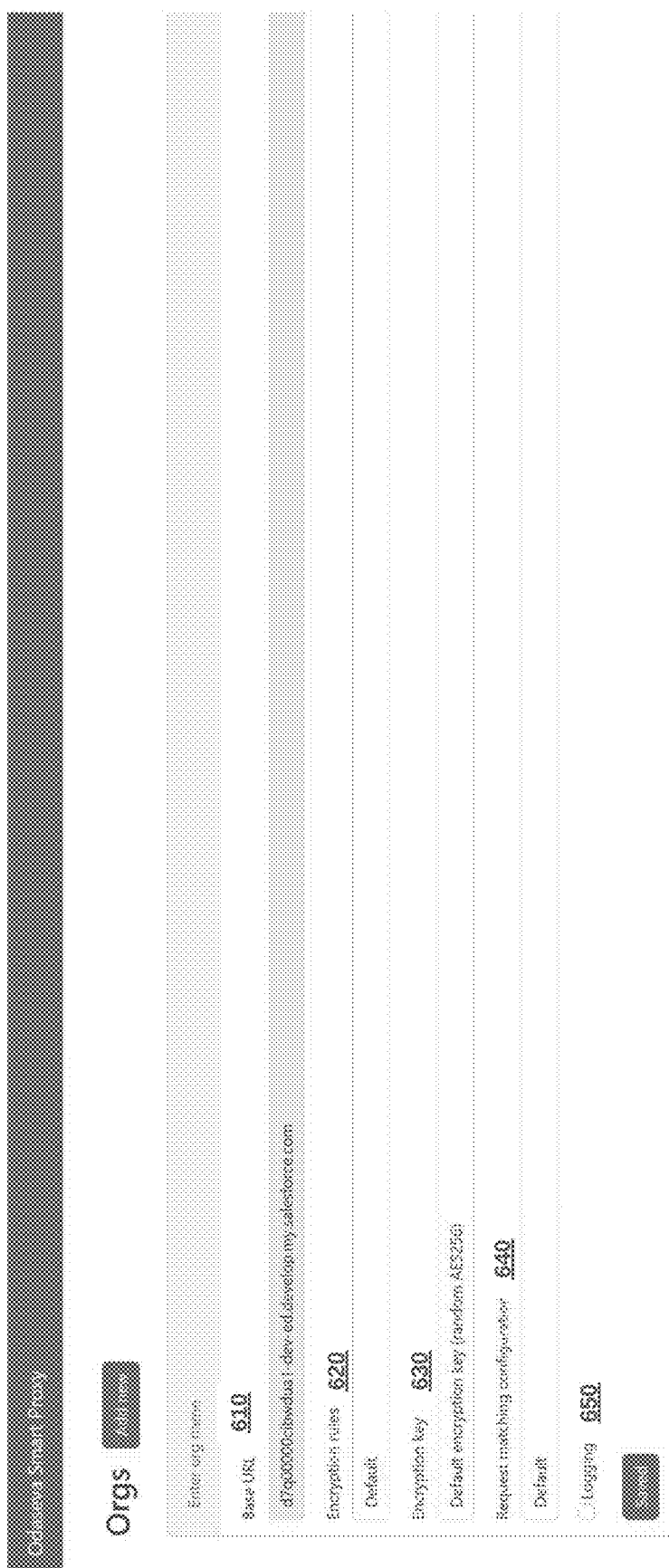
FIG. 6 is a screenshot that illustrates an example user interface for configuring an encryption proxy.

FIGS. 4 and 5 are example user interfaces that customers of the backup system would use to configure data transfer rules 105. FIG. 6 illustrates an example user interface that an administrator of the backup system would use to configure other aspects of the encryption proxy for a customer, as well as set up the options displayed to a customer for configuring the data transfer rules. This example includes the following fields:

- URL (610): The URL of the external application with which the encryption proxy enables the backup system to communicate.
- Encryption Rules (620): Specifies whether or not a default list of "do not encrypt" fields will be displayed in the user interface of FIG. 5. If a default list needs to be tuned, the customer can edit the list using the user interface of FIG. 5.
- Encryption Key (630): The key to be used to encrypt the data. The key may be locally stored in the encryption proxy or managed by a key management service.
- Request Matching Configuration (640): Specifies whether or not a default list of message-level transfer rules will initially be displayed to the customer in the user interface of FIG. 4. If a default list needs to be tuned, the customer can edit the list using the user interface of FIG. 4.
- Logging (650): If this field is checked, the customer's encryption proxy activity is logged.

4. General

The methods described with respect to FIGS. 1-6 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention.

The invention claimed is:

1. A method, performed by a computer system, for transmitting customer data between a backup system and an external application while preventing the backup system from viewing sensitive data at any stage of a backup or restore process, the method comprising:

providing an encryption proxy between a backup system and an external application, wherein the encryption proxy is within a customer-controlled data perimeter and wherein the backup system is outside the customer-controlled data perimeter;

enabling a customer to configure data transfer rules that specify 1) which types of messages transmitted between the backup system and the external application require encryption or decryption and 2) a set of data items in the customer data corresponding to the messages that are permitted in cleartext beyond the customer-controlled data perimeter;

transmitting messages between the external application and the backup system via the encryption proxy, wherein:

when the encryption proxy receives a message with a data payload having data items from the external application for transmission to the backup system, the encryption proxy converts the data items to ciphertext, except for those data items permitted in cleartext beyond the customer-controlled data perimeter per the configurable data transfer rules, before forwarding the message to the backup system; and when the encryption proxy receives a message from the backup system to the external application having a data payload with one or more data items in ciphertext, the encryption proxy converts said data items from ciphertext to cleartext before forwarding the message to the external application.

2. The method of claim 1, wherein transmitting a message from the backup system to the external application via the encryption proxy comprises the following steps:

receiving a message at the encryption proxy from the backup system and intended for the external application;

determining whether the message requires any decryption based on the configurable data transfer rules;

if the configurable data transfer rules indicate that the message does not require decryption, forwarding the message from the encryption proxy to the external application without performing any decryption on the message;

if the configurable data transfer rules indicate that the message requires decryption, performing the following:

identifying a plurality of ciphertext data items in the message that require decryption based on the configurable data transfer rules;

decrypting the identified data items to transform the plurality of ciphertext data items to cleartext; and transmitting the message to the external application with the cleartext data items.

3. The method of claim 1, wherein transmitting a message from the external application to the backup system via the encryption proxy comprises the following steps:

receiving a message at the encryption proxy that is transmitted from the external application and intended for the backup system;

determining whether the message requires any encryption based on configurable data transfer rules;

if the configurable data transfer rules indicate that the message does not require encryption, forwarding the message from the encryption proxy to the backup system without performing any encryption on the message; and if the configurable data transfer rules indicate that the message requires encryption, performing the following:

identifying a plurality of data items in the message that are permitted in cleartext beyond the customer-controlled data perimeter;

encrypting all the data items in the message except for the identified plurality of data items; and transmitting the message to the backup system.

4. A non-transitory computer-readable medium comprising a computer program, that, when executed by a computer system, enables the computer system to perform the following steps for transmitting customer data between a backup system and an external application while preventing the backup system from viewing sensitive data at any stage of a backup or restore process, the steps comprising:

providing an encryption proxy between a backup system and an external application, wherein the encryption proxy is within a customer-controlled data perimeter and wherein the backup system is outside the customer-controlled data perimeter;

enabling a customer to configure data transfer rules that specify 1) which types of messages transmitted between the backup system and the external application require encryption or decryption and 2) a set of data items in the customer data corresponding to the messages that are permitted in cleartext beyond the customer-controlled data perimeter;

transmitting messages between the external application and the backup system via the encryption proxy, wherein:

when the encryption proxy receives a message with a data payload having data items from the external application for transmission to the backup system, the encryption proxy converts the data items to ciphertext, except for those data items permitted in cleartext beyond the customer-controlled data perimeter per the configurable data transfer rules, before forwarding the message to the backup system; and when the encryption proxy receives a message from the backup system to the external application having a data payload with one or more data items in ciphertext, the encryption proxy converts said data items from ciphertext to cleartext before forwarding the message to the external application.

5. The non-transitory computer-readable medium of claim 4, wherein transmitting a message from the backup system to the external application via the encryption proxy comprises the following steps:

receiving a message at the encryption proxy from the backup system and intended for the external application;

determining whether the message requires any decryption based on the configurable data transfer rules;

if the configurable data transfer rules indicate that the message does not require decryption, forwarding the message from the encryption proxy to the external application without performing any decryption on the message;

if the configurable data transfer rules indicate that the message requires decryption, performing the following:

identifying a plurality of ciphertext data items in the message that require decryption based on the configurable data transfer rules;

decrypting the identified data items to transform the plurality of ciphertext data items to cleartext; and transmitting the message to the external application with the cleartext data items.

6. The non-transitory computer-readable medium of claim 4, wherein transmitting a message from the external application to the backup system via the encryption proxy comprises the following steps:

receiving a message at the encryption proxy that is transmitted from the external application and intended for the backup system;

determining whether the message requires any encryption based on configurable data transfer rules;

if the configurable data transfer rules indicate that the message does not require encryption, forwarding the message from the encryption proxy to the backup system without performing any encryption on the message; and if the configurable data transfer rules indicate that the message requires encryption, performing the following:

identifying a plurality of data items in the message that are permitted in cleartext beyond the customer-controlled data perimeter;

encrypting all the data items in the message except for the identified plurality of data items; and transmitting the message to the backup system.

7. A computer system for transmitting customer data between a backup system and an external application while preventing the backup system from viewing sensitive data at any stage of a backup or restore process, the system comprising:

one or more processors;

one or more memory units coupled to the one or more processors, wherein the one or more memory units store instructions that, when executed by the one or more processors, cause the system to perform the operations of:

providing an encryption proxy between a backup system and an external application, wherein the encryption proxy is within a customer-controlled data perimeter and wherein the backup system is outside the customer-controlled data perimeter;

enabling a customer to configure data transfer rules that specify 1) which types of messages transmitted between the backup system and the external application require encryption or decryption and 2) a set of data items in the customer data corresponding to the messages that are permitted in cleartext beyond the customer-controlled data perimeter;

transmitting messages between the external application and the backup system via the encryption proxy, wherein:

when the encryption proxy receives a message with a data payload having data items from the external application for transmission to the backup system, the encryption proxy converts the data items to ciphertext, except for those data items permitted in cleartext beyond the customer-controlled data perimeter per the configurable data transfer rules, before forwarding the message to the backup system; and when the encryption proxy receives a message from the backup system to the external application having a data payload with one or more data items in ciphertext, the encryption proxy converts said data items from ciphertext to cleartext before forwarding the message to the external application.

8. The system of claim 7, wherein transmitting a message from the backup system to the external application via the encryption proxy comprises the following steps:

receiving a message at the encryption proxy from the backup system and intended for the external application;

determining whether the message requires any decryption based on the configurable data transfer rules;

if the configurable data transfer rules indicate that the message does not require decryption, forwarding the message from the encryption proxy to the external application without performing any decryption on the message;

if the configurable data transfer rules indicate that the message requires decryption, performing the following:

identifying a plurality of ciphertext data items in the message that require decryption based on the configurable data transfer rules;

decrypting the identified data items to transform the plurality of ciphertext data items to cleartext; and transmitting the message to the external application with the cleartext data items.

9. The system of claim 7, wherein transmitting a message from the external application to the backup system via the encryption proxy comprises the following steps:

receiving a message at the encryption proxy that is transmitted from the external application and intended for the backup system;

determining whether the message requires any encryption based on configurable data transfer rules;

if the configurable data transfer rules indicate that the message does not require encryption, forwarding the message from the encryption proxy to the backup system without performing any encryption on the message; and if the configurable data transfer rules indicate that the message requires encryption, performing the following:

identifying a plurality of data items in the message that are permitted in cleartext beyond the customer-controlled data perimeter;

encrypting all the data items in the message except for the identified plurality of data items; and transmitting the message to the backup system.

* * * * *